United States Patent [19]

Chapman, Jr. et al.

[11] Patent Number: 5,106,911

[45] Date of Patent: Apr. 21, 1992

[54] PROCESS AND PROCESSING AID FOR EXTRUDING A HYDROCARBON POLYMER

[75] Inventors: George R. Chapman, Jr., Media, Pa.; Donnan E. Priester, Wilmington, Del.

[73] Assignee: E. I. Du Pont de Nemours and Company, Wilmington, Del.

[21] Appl. No.: 729,896

[22] Filed: Jul. 15, 1991

Related U.S. Application Data

[63] Continuation of Ser. No. 418,006, Oct. 6, 1989, abandoned.

[51] Int. Cl.$^5$ .................. C08L 23/04; C08L 27/18; B29K 27/12
[52] U.S. Cl. ................... 525/199; 264/211; 264/349; 264/169; 525/200
[58] Field of Search ............... 525/197, 199, 200; 264/177.2, 210.6, 211, 349, 169

[56] References Cited

U.S. PATENT DOCUMENTS

| | | | |
|---|---|---|---|
| 3,005,795 | 10/1961 | Busse et al. | 525/199 |
| 3,125,547 | 3/1964 | Blatz | 525/199 |
| 3,334,157 | 8/1967 | Larsen | 525/197 |
| 4,740,341 | 4/1988 | Chu | 264/211 |
| 4,837,074 | 6/1989 | Rosinski et al. | 525/199 |
| 4,904,735 | 2/1990 | Chapman, Jr. et al. | 525/199 |

FOREIGN PATENT DOCUMENTS

| | | | |
|---|---|---|---|
| 45-30574 | 10/1970 | Japan . | |
| 59-193940 | 11/1984 | Japan | 525/199 |
| 62-64847 | 3/1987 | Japan . | |
| 64-74247 | 3/1989 | Japan . | |

*Primary Examiner*—Jeffery Thurlow
*Assistant Examiner*—Mathieu Vargot

[57] ABSTRACT

An extrusion process for difficultly melt processible resins, for example, a difficultly-melt-processible hydrocarbon polymer, having improved processability and having incorporated therein an elastomeric fluorocarbon copolymer, for example, an amorphous vinylidene fluoride copolymer, and a crystalline vinylidene fluoride polymer.

30 Claims, No Drawings

PROCESS AND PROCESSING AID FOR EXTRUDING A HYDROCARBON POLYMER

This application is a continuation of application Ser. No. 07/418,006 filed Oct. 6, 1989, now abandoned.

FIELD OF THE INVENTION

The present invention relates to extrusion of difficultly-melt-processible polymers using fluoropolymer processing aids.

BACKGROUND OF THE INVENTION

The melt extrusion of high molecular weight polymers, for example, hydrocarbon polymers, into shaped structures such as tubing, pipe, wire coating or film is accomplished by well-known procedures wherein a rotating screw pushes a heated, molten and viscous polymer melt through the extruder barrel into a die in which the polymer is shaped to the desired form and is then subsequently cooled and resolidified, by various means, into the general shape of the die.

In order to achieve low production costs it is desirable to extrude at high rates. Although the extrusion rate is readily increased by increasing the rate of revolution of the extruder screw, there is a technical limit to these increases because of the viscoelastic properties of the polymer. At rates above this limit the polymer may be mechanically heated to temperatures at which thermal decomposition can occur, or extrudates with a rough surface are obtained. The latter phenomenon can generate an undesirable pattern on the surface of the extrudate. One way of avoiding this occurrence is to extrude at a higher temperature, but this adds to the processing costs and makes cooling of the extrudate more difficult. More seriously, many polyolefins are already extruded at temperatures near their decomposition temperatures, and further increases are not feasible.

It is desirable, therefore, to find highly efficient means of increasing the extrusion rate, without raising the melt temperature, while producing products with smooth surfaces. Changes in extruder and die configuration can improve melt flow but are not always practical or economically feasible. Another approach involves the addition of conventional wax-type process aids which reduce bulk viscosity and in some cases improve processing properties. However, the efficiency is marginal and the high levels of additive required often adversely affect other properties. In Blatz, U.S. Pat. No. 3,125,547, it is disclosed that the use of 0.01-2.0 wt. % of a fluorocarbon polymer that is in a fluid state at process temperature, such as a fluoroelastomer, will reduce die pressure and significantly increase the extrusion rate at which melt fracture occurs for high and low density polyethylenes and other polyolefins.

Kamiya and Inui, in Japanese Patent Application Publication Tokuko 45-30574 (1970, examined) cite the use of crystalline fluorocarbon polymers at temperatures below their melting points to eliminate die build-up but say nothing of other extrusion improvements. Nishida, Tate and Kitani, in Japanese Patent Application Publication Kokai 62-64847, disclose injection molding compositions comprising an ethylene/alpha olefin copolymer having an MFR of 0.2-200 g/10 min., a density of 0.850-0.945 g/cm$^3$, and 0.001-1% by weight of a fluorinated hydrocarbon polymer having an F/C ratio of at least 1:2.

Chu, in U.S. Pat. No. 4,740,341, discloses blends having improved extrudability and comprising a linear polymer of ethylene having incorporated therein 0.01-0.5 wt. %, based on the composition, of a fluorocarbon polymer having an F/C ratio of at least 1:2 and which is fluid at 120°-300° C., and 0.01-0.5 wt. %, based on the composition, of a polysiloxane.

Larsen, in U.S. Pat. No. 3,334,157, discloses polyethylene which has been modified to improve its optical properties by incorporating therein 0.015 to greater than 1.7 % by wt., based on the mixture, of finely divided polytetrafluoroethylene.

It is an object of this invention to provide resin compositions with substantially improved extrusion characteristics. It is another object to provide polymers which can be extruded at high rates to give extrudates of high surface quality. It is yet another object to provide polymers that can be extruded at low die pressures and at low melt temperatures. A still further object is to provide all the above with particular emphasis on high molecular weight hydrocarbon polymers which are susceptible to melt processing difficulties of the type discussed above. Other objects will become apparent hereinafter.

SUMMARY OF THE INVENTION

The subject invention provides a polymer blend composition having improved processibility and comprising: (a) a major portion of a difficultly-melt-processible hydrocarbon polymer, and (b) a minor portion of: (1) at least an effective amount, to improve processability, of an elastomeric fluorocarbon copolymer and (2) at least an effective amount, to improve processability, of a crystalline vinylidene fluoride polymer.

In another embodiment, the subject invention provides an extrusion process comprising melt extruding a difficultly-melt-processible hydrocarbon polymer having incorporated therein an effective amount, to improve processability, with parts totaling 100, of a processing aid comprising: (a) 2-95 parts by weight of an elastomeric fluorocarbon copolymer and (2) 98-5 parts by weight of a crystalline vinylidene fluoride polymer.

DETAILED DESCRIPTION

In the practice of this invention it has been found, surprisingly, that the extrusion behavior of difficultly-melt-processible hydrocarbon resins is very much improved when certain of the heretofor known fluoropolymer extrusion aids are used in synergistic combinations.

The term "extrusion behavior" is intended to include such parameters as the die pressure reached during extrusion, the operating melt temperatures and the maximum extrusion rates that can be achieved while maintaining melt stability and good extrudate surface quality. Thus the difficultly-melt-processible hydrocarbon polymers disclosed herein may be extruded at significantly lowered die pressures while maintaining high extrusion rates and enhanced surface smoothness of extruded articles, and also, in the case of blown films, improved clarity.

The difficultly-melt-processible polymers of this invention are hydrocarbon polymers having a melt index (ASTM-D1238) at 190° C. of 5.0 or less, preferably 2.0 or less and may comprise an elastomeric copolymer of ethylene and propylene, and optionally an non-conjugated diene monomer, for example 1,4-hexadiene, or, in general, any thermoplastic hydrocarbon polymer obtained by the homopolymerization or copolymerization of a monoolefin having the formula CH2=CHR, where R is H or an alkyl radical, usually of not more than eight carbon atoms. In particular, this invention is applicable to polyethylene, both the high density type and the low density type, for example, having densities within the range 0.89 to 0.97; polypropylene; polybutene-1; poly(3-methylbutene); poly(methylpentene); and linear low density copolymers of ethylene and alpha-olefins such as propylene, butene-1, octene-1, decene-1, octadecene, etc.

Because of the different melt characteristics of the different hydrocarbon polymers mentioned, the practice of this invention may have greater utility in some hydrocarbon polymers than in others. Thus, hydrocarbon polymers such as polypropylene and branched polyethylene that are not high in molecular weight have good melt flow characteristics even at lower temperatures, so that surface roughness and other surface defects can be avoided by adjustment of extrusion conditions, and these hydrocarbon polymers may only require the use of the fluorocarbon polymer extrusion aids and process of this invention, under adverse extrusion conditions. However, other polymers such as high molecular weight, high density polyethylene or linear low density polyethylene copolymers, and high molecular weight polypropylene and propylene copolymers with other olefins, particularly those with narrow molecular weight distributions, do not have this degree of freedom in the variation of extrusion conditions and it is particularly with these resins that improvements in the surface quality of the extruded product and reduction in extrusion pressures are obtained with the compositions of this invention.

The elastomeric fluorocarbon polymers of type (1) are those that are normally in the fluid state at room temperature and above, i.e., they have a Tg below room temperature, and little or no crystallinity at room temperature. With respect to their chemical composition, it is preferred, but not essential, to employ fluorocarbon polymers having a fluorine to hydrogen ratio of at least 1:1.5. Said fluorocarbon polymers of type (1) will comprise 0.001 to 0.5 parts by weight, preferably 0.002 to 0.08 parts by weight of the composition. Fluorinated monomers which give rise to suitable polymers include vinylidene fluoride, hexafluoropropylene, chlorotrifluoroethylene, tetrafluoroethylene and perfluoroalkyl perfluorovinyl ethers. Specific examples of the fluorocarbon polymers of type (1) that may be employed in this invention include copolymers of vinylidene fluoride and a monomer selected from hexafluoropropylene, chlorotrifluoroethylene, 1-hydropentafluoropropylene and 2-hydropentafluoropropylene; copolymers of vinylidene fluoride, tetrafluoroethylene and hexafluoropropylene or 1- or 2-hydropentafluoropropylene; copolymers of tetrafluoroethylene and propylene and, optionally, vinylidene fluoride, all of which are known in the art. In some cases these copolymers may also include a bromo-containing monomer as taught in Apotheker and Krusic, U.S. Pat. No. 4,035,565, or terminal iodo-groups, as taught in U.S. Pat. No. 4,243,770. The latter patent also discloses the use of iodo group-containing fluoroolefin comonomers. When certain molar ratios of monomers are used in these copolymers, then the glass transition temperature is near or below 0° C., and these polymers are useful elastomers that are readily available articles of commerce.

The fluorocarbon polymers of type (2) include crystalline polymers of vinylidene fluoride and copolymers of vinylidene fluoride with, e.g., hexafluoropropylene that are above their melting or softening point in the range of 120° C. to 300° C., and preferably in the range of 150° C. to 250° C. Vinylidene fluoride homopolymers usually have crystalline melting point maxima in the range of 165°–170° C., as determined by thermoanalytical methods. Useful copolymers of hexafluoropropylene with hexafluoropropylene have melting maxima in the range 130°–160° C. depending upon the amount of copolymerized hexafluoropropylene. Said fluororesin will comprise 0.001–0.5 parts by weight, preferably 0.01–0.1 parts by weight of the composition.

The synergistic combination of fluoropolymer extrusion aids of the invention will comprise (1) fluoroelastomers and (2) a crystalline vinylidene fluoride polymer. Both should have a sufficiently high molecular weight, with number average molecular weights greater than 10,000, such that they do not exude from the hydrocarbon polymer at processing temperatures.

Quantities in excess of 1 wt. % are not necessary. In general, the fluorocarbon polymers are not compatible with the difficulty-melt-processible polymer, that is to say, are not soluble in such polymer, and the addition of higher levels serves no useful purpose. When the incompatible fraction becomes too large, it may adversely affect the optical properties of the extrudate. Such is the case, for example, when the difficulty-melt-processible polymer is a hydrocarbon polymer. The beneficial effects of even very low ratios of types (1) to (2) or types (2) to (1) are readily evident but, in general, there will be an optimum ratio of types (1) to (2) which may be determined experimentally for any particular combination of types (1) and (2). The weight ratio of fluorocarbon polymer type (1) to fluorocarbon polymer type (2) may vary from 10/90 to 90/10, preferably from 20/80 to 80/20.

It will also be recognized by one skilled in the art that it may not be possible to achieve, simultaneously, reduced die pressure, increased throughput and improved surface quality to the maximum extent at given concentration of types (1) and (2). Thus, one might elect to attain maximum improvement in one parameter, in particular, at the expense of corresponding improvements in other parameters. For example, increased output of extrudate with high quality surface characteristics may not necessarily be accompanied by reduced die pressure. The best set of conditions will be determined by the specific requirements of the extrusion.

The addition of the fluorocarbon polymer modifiers to the difficultly-melt-processible polymer can be accomplished by any of the means heretofore developed for the addition of modifiers to such polymers. For example, the fluorocarbon polymers (1) and (2) may be added independently to, for example, a hydrocarbon polymer on a rubber compounding mill or in a Banbury or other internal mixer or in a mixing extruder, in all of which the fluorocarbon polymers are uniformly distributed throughout the host polymer. It is also feasible to dry-blend the two fluoropolymers with the host polymer in the solid state, and then effect uniform distribution of the fluoropolymers in the melt extruder employed in the fabrication by using an extruder screw with good mixing capability.

Alternatively, masterbatch dispersions (mixtures) of types (1) and (2) in a diluent polymer, either together or separately, can be metered to the feed section of the extruder by appropriate devices. The diluent polymer can be a difficultly-melt-processible polymer, or it can be a melt-processible polymer that does not substantially deleteriously affect the polymer composition in achieving the beneficial effects of the invention. For example, the diluent polymer can be a melt-processible hydrocarbon polymer, such as a homopolymer or copolymer of a monoolefin(s) of the formula $RCH=CH_2$ wherein R is H or an alkyl radical, usually or not more than eight carbon atoms. In most cases such a hydrocarbon polymer will have a melt index (ASTM D-1238) at 190° C. of 20.0 or less, preferably 5.0 or less. In preparing such masterbatches the amounts of fluorocarbon polymers types (1) and (2) will usually be such that they provide 1-25 wt. %, preferably 1-10 wt. %, of the masterbatch. Further to the above regarding the need to avoid adversely affecting the beneficial effects of the invention, in preparing the masterbatch, the concentrations of types (1) and (2), as well as the diluent polymer, will be selected so as to achieve good mixing of all the ingredients. In any of the above procedures, it is also possible to employ previously prepared mixtures of fluorocarbon polymer type (1) with fluorocarbon polymer type (2).

In the practice of this invention, it will be found that the beneficial effects are not necessarily observed immediately on the onset of extrusion, and depending on the overall concentrations of modifier, it may take from 10 minutes to 8 hours to reach stable extrusion rate and die pressure. Longer times are required at low concentrations of types (1) and (2). When it is desirable to operate at very low levels of modifiers and hasten the achievement of equilibrium, it may be expedient to first "condition" the extruder rapidly using a composition containing 0.1 to 1 wt. % of the fluorocarbon polymers types (1) and (2), and then to switch to the desired concentrations of types (1) and (2).

Just as it has been observed that the beneficial effects may not be observed immediately, it has also been observed that the beneficial effects may continue to be observed after addition of the fluorocarbon polymers of types (1) and (2) is discontinued. Consistent with this observation, after stable extrusion rate and die pressure are achieved, the beneficial effects of the invention may be realized by alternating a feed of difficultly melt-processible polymer and one containing the processing aid of the invention.

EXAMPLES

The evaluations reported below employed a C. W. Brabender Computerized Plasti-Corder equipped with a 19.1 mm. (¾ in.) diameter extruder with a 25/1 length/diameter ratio. The screw had ten feed flights, 10 compression flights with a compression ratio of 3:1, and 5 metering flights. Operating parameters were controlled by 5 independent heating zones (No. 5 closest to the die), four pressure transducers and a torque-measuring drive unit with 1-120 rpm capability. The instrument was equipped with software for extrusion testing. The capillary die, made from #416 stainless steel, had a diameter of 2 mm and a length of 40 mm.

In operation, the required machine conditions were set and the polymer resin was then extruded, usually at 40 rpm, until equilibrium (constant throughput and constant die pressure) were reached. For a linear low density polyethylene with a melt index at 190° C. of 1, extrusion at 40 rpm gave a throughput of about 19-20 g./min. and a die pressure of about 28 MPa. For experiments that were run in sequence, by changing the feed composition, the initial output parameters corresponded to the previous equilibrium, and then gradually changed to a new equilibrium. When equilibrium was achieved a range of screw speeds were then run to produce new equilibrium values of throughput and die pressure. The relation between throughput and die pressure was determined from a plot of the data, and die pressure data at certain fixed production rat=s were then estimated for comparison of data between experiments. Surface quality of the extrudate was judged by visual examination. For purposes or comparison, "melt fracture" is defined as a herringbone-like roughness on the surface of the extrudates.

After each example the extruder was thoroughly cleaned. The equipment was first purged with a highly filled abrasive composition (VCC-UCC-0964). It was disassembled and each section—screw, barrel, die assemble, and transducers—were cleaned, first with a wire brush, and then with methyl ethyl ketone solvent. The capillary die was removed and heated with a propane torch until it was free of polymer and had reached a red glow. After reassembly and calibration of the transducers the unmodified hydrocarbon resin was run first to establish equilibrium conditions, and to assure that reliable output was being obtained. For this purpose, the equilibrium value at 40 rpm, only, was sometimes used. If previously established equilibrium values for unmodified resin were not achieved, the cleanout procedure was repeated.

The high molecular weight linear low density polyethylene (LLDPE) used in the following examples was a commercially available copolymer of ethylene and butene-1 and had density of 0.918 and a melt index (ASTM D-1238, cond. E) of 1.0. The fluoroelastomer was a commercially available copolymer having repeat units of 60 wt. % vinylidene fluoride and 40 wt. % hexafluoropropylene, and had a Mooney viscosity, ML-4, of 60 at 121° C. It was in the form of a 2 wt. % concentrate in polyethylene. The polyvinylidene fluoride resin was a commercially available homopolymer reported to have a melting point of 165°-170° C. Compositions for evaluation of extrusion properties were prepared by dry blending of the fluoroelastomer concentrate and/or the polyvinylidene fluoride powder and linear low density polyethylene.

COMPARATIVE EXAMPLE 1

LLDPE was introduced to the Brabender extruder with the screw operating at 40 rpm and heating zones No 1, 2, 3, 4 and 5 controlling at nominal temperature settings of 150, 180, 200, 200 and 204 degrees Celsius, respectively. (Zone No. 5 is closest to the die.) Equilibrium extrusion conditions, where throughput and die pressure were constant, were reached after a period of 15 min. The screw rpm was then systematically varied from 12 rpm to 60 rpm. After determining the extrusion rate at various screw speeds, the data were input to the a computer program that generated a curve of die pressure vs. throughput from which selected data, tabulated as shown in Table 1, were computed. In this example the extrudate surface was dull and had melt fracture at all throughput rates above 4 g/min.

COMPARATIVE EXAMPLE 2

An extruder warm-up was carried out as in Comparative Example 1 using linear low density polyethylene, giving similar results. Linear low density polyethylene, which as a dry blend had intimately dispersed therein 0.02 wt. % of fluoroelastomer was then introduced to the extruder at the same temperature settings and at a screw speed of 40 rpm. A steady state was achieved after 60 min. and did not change after a further 60 min. Data relating die pressure and throughput were obtained as in Comparative Example 1. The die pressures were lower than for the unmodified LLDPE, as shown in Table 1, and melt fracture occurred when throughput exceeded 30 g./min.

COMPARATIVE EXAMPLE 3

An extruder warm-up was carried out as in Comparative Example 1 using linear low density polyethylene, giving similar results. Linear low density polyethylene, which as a dry blend had intimately dispersed therein 0.02 wt. % of polyvinylidene fluoride was then introduced to the extruder at the same temperature settings and at a screw speed of 40 rpm. A steady state was achieved after 60 min. and did not change after a further 60 min. Data relating die pressure and throughput were obtained as in Comparative Example 1. The die pressures were lower than for the unmodified LLDPE, as shown in Table 1. Melt fracture occurred when throughput exceeded 30 g./min.

EXAMPLE 1

An extruder warm-up was carried out as in Comparative Example 1 using linear low density polyethylene, giving similar results. Linear low density polyethylene, which as a dry blend had intimately dispersed therein 0.001 wt. % of polyvinylidene fluoride and 0.001 wt. % of fluoroelastomer was then introduced to the extruder at the same temperature settings and at a screw speed of 40 rpm. A steady state was achieved after 60 min. and did not change after a further 60 min. Data relating die pressure and throughput were obtained as in Comparative Example 1. The die pressures, shown in Table 1, were significantly lower than for the comparative examples, and melt fracture did not occur until throughput exceeded 30 g./min.

TABLE 1

|  | COMPARATIVE EXAMPLES | | | EXAMPLE |
|---|---|---|---|---|
|  | 1 | 2 | 3 | 1 |
| COMPOSITION (% by weight) | | | | |
| Linear low density polyethylene | 100 | 99.98 | 99.98 | 99.98 |
| fluoroelastomer | — | 0.02 | — | 0.01 |
| polyvinylidene fluoride | — | — | 0.02 | 0.01 |
| Throughput (g/min.) | Die pressure (MPa) | | | |
| 10 | 22.1 | 20.2 | 20.0 | 18.2 |
| 15 | 26.4 | 24.4 | 23.9 | 22.6 |
| 20 | 29.1 | 27.4 | 27.0 | 25.4 |
| 25 | 31.4 | 29.8 | 29.8 | 28.0 |
| 30 | 33.4 | 31.7 | 31.2 | 29.9 |

We claim:

1. A polymer blend composition having improved processibility and comprising:
   (a) a major portion of a difficultly-melt-processible hydrocarbon polymer comprising at least one monoolefin polymer; and
   (b) a minor portion of:
      (1) at least an effective amount, to improve processibility, of an elastomeric fluorocarbon copolymer that is fluid at the melt processing temperature of (a); and
      (2) at least an effective amount, to improve processibility, of a crystalline vinylidene fluoride polymer that is melted at the melt-processing temperature of (a).

2. Composition or claim 1 wherein the polymer (a) is a homopolymer or copolymer of one or more monoolefins of the formula $RCH=CH_2$ wherein R is H or alkyl.

3. Composition of claim 2 wherein alkyl is $C_{1-8}$ alkyl.

4. Composition of claim 1 wherein the polymer (a) is high density polyethylene.

5. Composition of claim 1 wherein the polymer (a) is a low density polyethylene.

6. Composition of claim 1 wherein the polymer (a) is a linear low density polyethylene copolymer.

7. Composition of claim 1 where the polymer (a) is a copolymer comprised of polymer repeat units of ethylene, propylene and a non-conjugated diene.

8. Composition or claim 1 or 2 wherein the amount of (b)(1) is no more than 0.5 wt. %, based on the weight of (a).

9. Composition or claim 1 or 2 wherein the amount of (b)(1) is 0.002–0.08 wt. %, based on the weight of (a).

10. Composition or claim 1 or 2 wherein the amount of (b)(2) is 0.002–0.08 wt. %, based on the weight of (a).

11. Composition or claim 1 or 2 wherein, in component (b)(1), the mole ratio of fluorine to hydrogen is at least 1:1.5.

12. Composition or claim 1 or 2 wherein component (b)(1) is a fluorocarbon copolymer of a monomer selected from the group consisting of vinylidene fluoride, hexafluoropropylene, chlorotrifluoroethylene, tetrafluoroethylene and perfluoroalkyl perfluorovinyl ether.

13. Composition of claim 1 or 2 wherein component (b)(1) is a copolymer of vinylidene fluoride and a monomer selected from the group consisting of hexafluoropropylene, chlorotrifluoroethylene, 1-hydropentafluoropropylene and 2-hydropentafluoropropylene.

14. Composition of claim 1 or 2 wherein component (b)(1) is a terpolymer of vinylidene fluoride, tetrafluoroethylene, and hexafluoropropylene or 1- or 2-hydropentafluoropropylene.

15. Composition or claim 1 or 2 wherein component (b)(1) is a copolymer of tetrafluoroethylene and propylene, or a copolymer of tetrafluoroethylene, propylene and vinylidene fluoride.

16. Composition or claim 1 or 2 wherein the weight ratio of component (b)(1) to component (b)(2) is within the range 10:90 to 90:10.

17. Composition or claim 1 or 2 wherein the weight ratio of component (b)(1) to component (b)(2) is within the range 20:80 to 80:20.

18. Composition of claim 1 or 2 wherein (b)(2) is a copolymer of vinylidene fluoride and hexafluoropropylene.

19. The composition of claim 1 wherein (a) is a linear low density polyethylene polymer, (b)(1) has a molecular weight of at least 10,000 and is comprised of copolymerized units of vinylidene fluoride, hexafluoropropylene and tetrafluoroethylene in a mole ratio of 45-90:5-50:0-35, (b)(2) is a homopolymer of vinylidene fluoride, and the weight ratio of (b)((1):(b)(2) is from 10:90 to 90:10.

20. The composition of claim 1 wherein (a) is a linear low density polyethylene polymer, (b)(1) has a molecular weight of at least 10,000 and is comprised of copolymerized units of vinylidene fluoride, hexafluoropropylene and tetrafluoroethylene in a mole ratio of 45-90-:5-50:0-35, (b)(2) is a crystalline copolymer of vinylidene fluoride and hexafluoropropylene, and the weight ratio of (b)(1):(b)(2) is from 10:90 to 90:10.

21. An extrusion process comprising melt extruding a difficultly melt-processible hydrocarbon polymer comprising at least one monoolefin polymer having incorporated therein an effective amount, to improve processability, with parts totaling 100, of a processing aid comprising
   (a) 10-90 parts by weight of an elastomeric fluorocarbon copolymer that is fluid at the temperature of the extrusion process and
   (b) 90-10 parts by weight of a crystalline vinylidene fluoride polymer that is melted at the temperature of the extrusion process.

22. Process of claim 21 wherein the difficulty-melt-processible polymer is a homopolymer or copolymer of one or more monoolefins of the formula $RCH=CH_2$ wherein R is H or alkyl.

23. Process of claim 21 or 22 wherein the mole ratio of fluorine to hydrogen in component (a) is at least 1:1.5.

24. Process of claim 21 or 22 wherein component (a) is a fluorocarbon copolymer of a monomer selected from the group consisting of vinylidene fluoride, hexafluoropropylene, chlorotrifluoroethylene, tetrafluoroethylene and perfluoroalkyl perfluorovinyl ether.

25. Process of claim 21 or 22 wherein component (a) is a copolymer of vinylidene fluoride and a monomer selected from the group consisting of hexafluoropropylene, chlorotrifluoroethylene, 1-hydropentafluoropropylene and 2-hydropentafluoropropylene.

26. Process of claim 21 wherein the component (a) is a terpolymer of vinylidene fluoride, tetrafluoroethylene, and hexafluoropropylene or 1- or 2-hydropentafluoropropylene.

27. Process of claim 21 or 22 wherein component (a) is a copolymer of tetrafluoroethylene and propylene or a copolymer of tetrafluoroethylene propylene and vinylidene fluoride.

28. Process of claim 21 or 22 wherein (b) is a copolymer of vinylidene fluoride and hexafluoropropylene.

29. Process of claim 21 wherein the difficulty-melt-processible polymer is a linear low density polyethylene polymer, (a) has a molecular weight of at least 10,000 and is comprised of copolymerized units of vinylidene fluoride, hexafluoropropylene and tetrafluoroethylene in a mole ratio of 45-90:5-50:0-35, (b) is a homopolymer of vinylidene fluoride, and the weight ratio of (a):(b) is from 10:90 to 90:10.

30. Process of claim 21 wherein the difficulty-melt-processible polymer is a linear low density polyethylene polymer, (a) has a molecular weight of at least 10,000 and is comprised of copolymerized units of vinylidene fluoride, hexafluoropropylene and tetrafluoroethylene in a mole ratio of 45-90:5-50:0-35, (b) is a crystalline copolymer of vinylidene fluoride and hexafluoropropylene, and the weight ratio of (a):(b) is from 10:90 to 90:10.

* * * * *